United States Patent [19]

Fischer et al.

[11] 4,413,537
[45] Nov. 8, 1983

[54] METHOD OF MAKING A TUBULAR CYLINDER FOR EXTRUDING A PRODUCT

[75] Inventors: Robert R. Fischer, Michigan City; Joe R. Urschel, Valparaiso, both of Ind.

[73] Assignee: Urschel Laboratories, Incorporated, Valparaiso, Ind.

[21] Appl. No.: 420,738

[22] Filed: Sep. 21, 1982

Related U.S. Application Data

[62] Division of Ser. No. 286,373, Jul. 24, 1981.

[51] Int. Cl.³ ............................................. B21K 21/00
[52] U.S. Cl. ................................... 76/101 R; 228/160
[58] Field of Search ................... 29/418, 445; 228/60, 228/160, 173 D, 174; 76/101 R

[56] References Cited

U.S. PATENT DOCUMENTS

| | | | |
|---|---|---|---|
| 3,803,951 | 4/1974 | Borgley | 29/445 |
| 3,864,182 | 2/1975 | Shobert | 156/168 |
| 4,033,204 | 7/1977 | Salakradze | 76/101 R |
| 4,378,294 | 3/1983 | Wagner | 166/231 |

*Primary Examiner*—Nicholas P. Godici
*Assistant Examiner*—Marc Hodak
*Attorney, Agent, or Firm*—Charles S. Penfold

[57] ABSTRACT

A tubular cylinder for use with other components and in which the wall of the cylinder is of a composite character made into a unitary structure and provided with a multitude of substantially radial holes in its periphery and a predetermined amount of a cylindrical surface of the wall is preferably cut away to fully open the holes whereby to provide passages through which a material to be processed and under pressure in the cylinder can be forced or extruded outwardly through the passages and thereby condition the material for its intended use.

13 Claims, 24 Drawing Figures

METHOD OF MAKING A TUBULAR CYLINDER FOR EXTRUDING A PRODUCT

BACKGROUND OF THE INVENTION

This application is a division of our application Ser. No. 286,373 filed July 24, 1981.

Machines are being manufactured in the United States and other countries for removing chicken meat from bones and for removing meat from the bones of other animals. The critical part of these machines is the cylinder containing many holes through the wall of the cylinder. The cylinders are made of stainless steel. More than 22,000 holes are often drilled through the wall of the cylinder. Some of these holes are as small as 0.026" diameter. The holes are usually drilled with two sizes of drills. The small diameter of the hole is on the inside of the cylinder and the larger diameter of the hole is on the outside of the cylinder. Meat and bone is forced into the feed end of the cylinder with some type of screw to cause the meat and bone to be placed under very high pressure. The meat extrudes through the small holes in the cylinder and the bone without the meat is discharged at the discharge end of the cylinder. The holes in these cylinders are usually drilled on computer controlled equipment. The material is stainless steel and the drills are very small. For this reason the drills break often and a great amount of time is required in drilling as many as 22,000 holes. Also, the cylinders presently being made are made of a poor type of stainless steel because this type of stainless steel is the easiest in which to drill holes.

OBJECTIVES OF THE INVENTION

With the foregoing in mind one of the most significant objectives of the present invention is to provide the wall of a tubular cylinder with a multitude or substantially infinite number of circumferentially and longitudinally spaced substantially non-circular radial passages or open holes without utilizing drills and the expense and maintenance associated with such use.

A particular object of the invention, which is applicable to at least one of the structures, is to provide a tubular cylindrical wall of a composite character which comprises a pilot tube, tubular cylindrical support or mounting and an appreciable number of circular layers of externally notched metal which are secured about the tube or support and united therewith in a manner whereby the notches and adjacent layers of the metal form a multitude of radially extending holes, slots or openings, the inner ends of which have been exposed by cutting away an internal cylindrical portion of the wall and thereby provide passages through which material in the cylinder can be processed by extruding it outwardly through these passages.

More specifically, an object of the invention is to provide and/or construct a tubular cylinder structure which comprises providing a tubular support and the circular layers of metal, above referred to, are preferably in the form of a single continuous externally notched planor strip of stainless steel of uniform thickness which is spirally wrapped about the tube and united therewith by brazing, and the notches are internally exposed by cutting away an internal portion of what was formerly the support and the internal continuous inner edge portion of the strip whereby to provide a substantially infinite number or a multitude of thousands of passages extending radially through the wall of the cylinder for the purpose intended.

A significant objective of the invention is to preferably provide a composite cylinder structure which includes a pilot tube and circular layers, convolutions, spirals or strip which are firmly clamped in intimate contact between a pair of end members carried by the tube and the end members are provided with inclined or helical surfaces and abutments which serve to respectively engage the end portions of the strip in order to promote uniformity in the spiral or helical character of the wrapping. The strip is preferably of a substantially uniform width so that when correctly wrapped about the tube it will substantially fill in the cylindrical space between the end members.

Another object of the invention is to provide a cylinder of stainless steel with a much better grade of steel having superior corrosion resistance and greater strength as compared to poorer grades which are presently used because of their adaptability to easier drilling of holes. Otherwise expressed, the various cylinders embodying the subject invention or inventions offers advantages with respect to strength, durability and cost of manufacture because, as generally alluded to above, no drilling of holes is involved and this is primarily due to the fact that the main work embodied in the subject cylinder is done by a simple punch press operation applied to material of a sheet metal character.

A further object is to provide a stainless steel strip for the use described above which is constructed by a steel mill with a finish known as a braze finish which is not smooth but is slightly rough so that when the circular portions of the strip are pressed together, there will be voids between the portions in order to permit the flow or infusion of silver of a braze material during the brazing or heat operation to flow into all of the voids between the layers as wall as between the layers, pilot tube and end members to form a solid unitary tubular cylinder structure having a wall of sufficient thickness which can be machined internally and/or externally to promote uniformity and a finished appearance.

A very significant objective of the invention is to provide one form of a strip in which the notches formed by a punch press operation are each defined by a pair of parallel marginal edges and an inner edge so that the strip may also be described as being divided into a multitude of projections or fingers which are joined together by inner reduced, narrow connecting or hinge portions which facilitate flexing and conformance of the strip substantially in its own plans about the pilot tube and cause the notches to widen and assume a tapered condition which promotes extrusion or outflow of the processed material through the passages. This factor is important because friction is appreciably reduced.

Other objects of the invention or inventions justify various modifications or different embodiments thereof such as utilizing externally or internally notched annular rings or segments and in modifying the structural characters of the notches, all of which are substantially disclosed in the drawings. As examples, the cylinders can be constructed so that the holes are normally open in the inside of the cylinders and closed on the outside in a manner whereby an outer cylindrical area of the cylinders can be removed to open them throughout the thickness of the cylindrical walls to provide radial passages.

Additional objects and advantages of the invention or inventions will become apparent after the description hereinafter set forth is considered in conjunction with the drawings annexed hereto.

Figure 1:
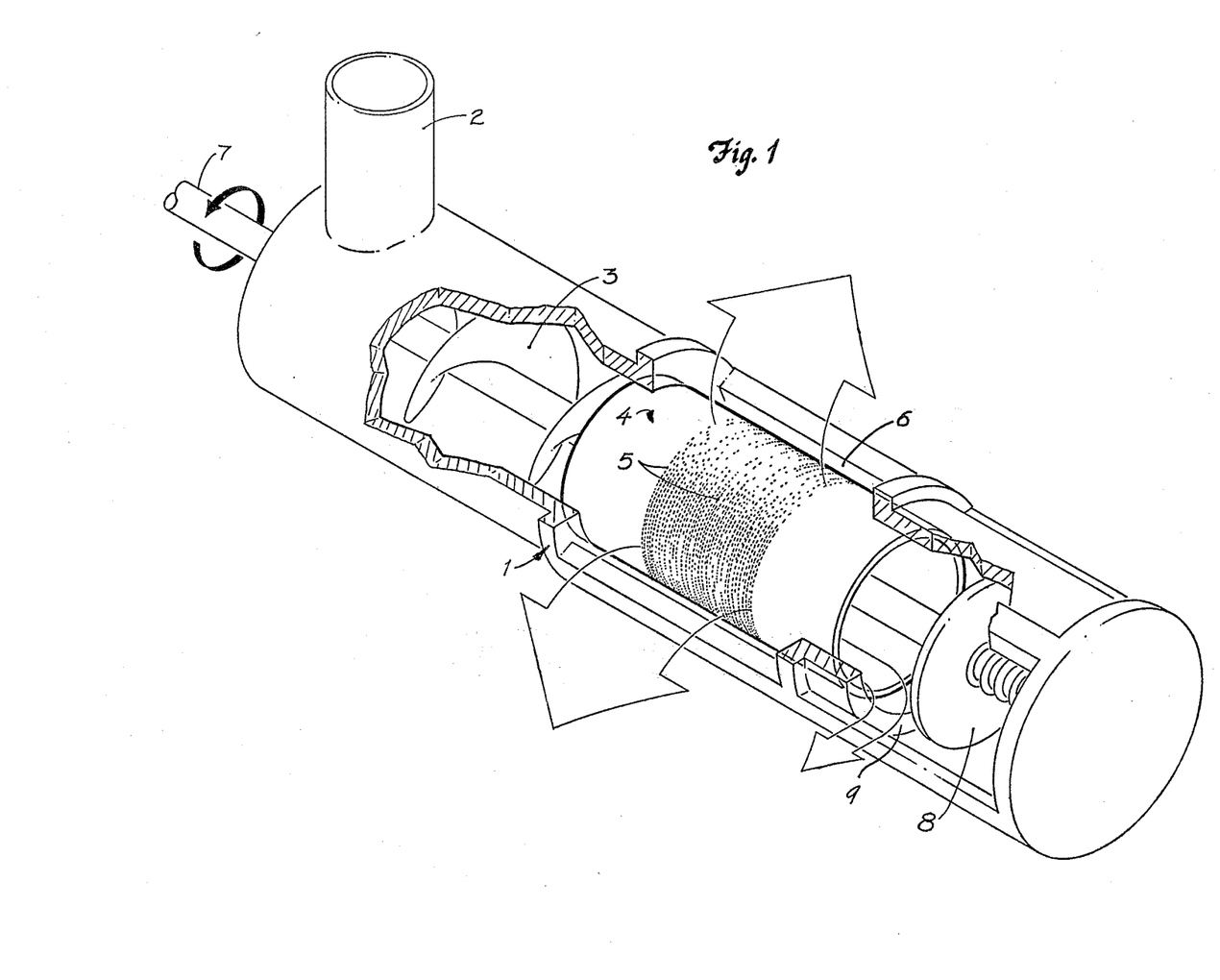
FIG. 1 is a symbolic or representative machine in which the cylinder embodying the invention or inventions is mounted.

DESCRIPTION OF FIG. 1

As alluded to above FIG. 1 is symbolic or representative of a machine embodying the cylinder of the subject invention or inventions and does not disclose a power unit, controls and other components which are not considered essential in order to understand the invention which is primarily directed to a cylinder. Otherwise expressed, the various cylinders exemplified in the subject application are intended for use in any of the machines presently in commercial use.

In FIG. 1 there is depicted an elongated casing or housing generally designated 1 having an entrance 2 and a feed screw 3 extending longitudinally in the casing and through a cylinder generally designated 4 for forcing the material into the cylinder and extruding it substantially radially outwardly through a multitude of passages 5 from which it is discharged outwardly from the casing through relatively large openings 6 (one shown) for the intended use. A shaft 7 of the screw is driven by a power unit not shown. The interior extremity of the casing at its entrance end is preferably provided with means, not shown, which serves to prevent the incoming material from rotating with the screw and the opposite end of the casing is provided with a spring pressed plate 8 mounted on the shaft 7 which automatically retracks when foreign matter, such as bone is compacted against the plate to allow the bone to be periodically discharged through one or more openings 9. The machine is operable substantially automatically with respect to extruding the needed material through the cylinder and separating it from bone structure.

CYLINDER STRUCTURE OF FIGS. 2–7.

Figure 2:
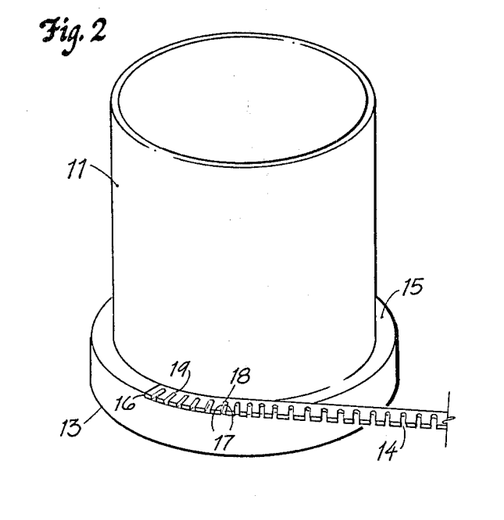
FIG. 2 is a pictorial view of a support or pilot tube showing an initial step in wrapping a strip of metal about the tube or support.
Figure 4:
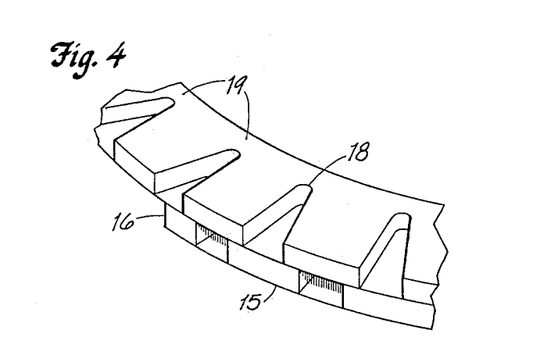
FIG. 4 is an enlarged partial perspective view depicting details of the structure of FIG. 3.
Figure 5:
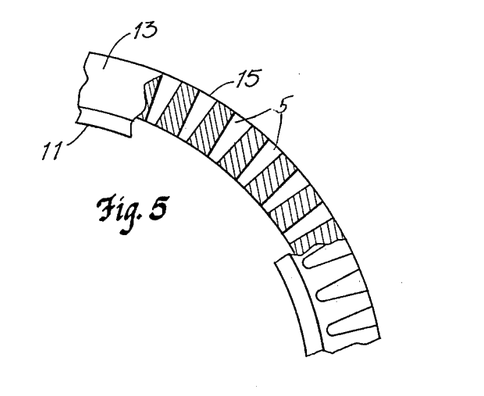
FIG. 5 is an enlarged partial view, with portions in section, to illustrate the removal of the pilot tube and inner portions of the circular layers of metal whereby to provide passages through which the material to be processed is extruded.
Figure 6:
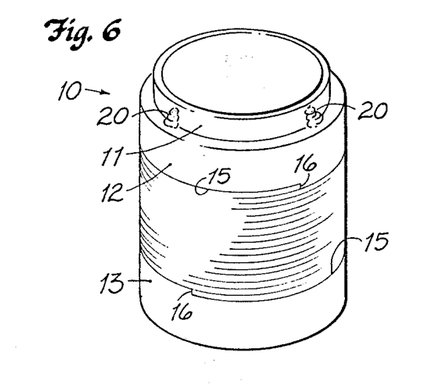
FIG. 6 is a pictorial view illustrating the fact that the strip has been completely helically coiled about the tube and has been fixedly held between a pair of annular end members carried by the tube.

FIGS. 2 through 7 disclose what may be referred to as a preferred embodiment of the invention or inventions which is utilized with the machine 1 or components depicted in FIG. 1. More particularly, FIG. 6 shows what may be referred to as a support generally designated 10 which preferably includes a cylindrical pilot tube or formation 11 and a pair of annular end members 12 and 13 which serve to hold a strip of metal 14 encircled or coiled about the tube. These components are constructed from a superior grade or grades of stainless steel and each end member is provided with an inclined or helical surface 15 which is interrupted by an abutment or step 16. The end member 13 is preferably fixedly secured to one end of the tube by spot welding, not shown, after it has been provided with a helical surface and abutment. The strip is normally straight and planar, of a substantially uniform thickness and uniform width and one of its longitudinally edge portions is interrupted by a multitude of equally spaced apart notches, each notch being defined by a pair of spaced parallel marginal edges 17 and an inner small concave marginal edge 18. These notches define what may also be referred to as parallel projections or fingers which are joined together at their inner ends by intervening connecting portions 19, the latter of which serve to facilitate bending and conformance of the strip about the pilot tube 11. The strip may be manually or machine assembled in conforming spirally or helical relationship with the tube and as depicted in FIG. 2 one end portion of the strip is initially placed on the helical surface 15 of the end member 13 and in engagement with the abutment 16 and so that the inner edge of the strip engages the tube and this end portion is then spot welded in place and any irregularity in the weld is removed in order that the upper surface of the strip at the weld is completely smooth.

Figure 3:
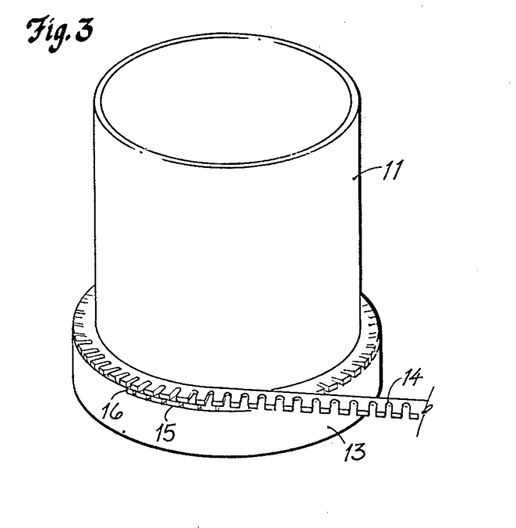
FIG. 3 is a view similar to FIG. 2, showing the strip partially coiled or encircling the tube.

After the circular layers of the strip have been correctly assembled about the tube the end member 12 is telescoped onto the tube so that the opposite or trailing end portion of the strip is in engagement with the helical surface and abutment of this end member and when these components are in their proper relationship the assembled structure is placed in a press to cause the end member 12 to force the circular layers into a compact intimate relation and against the end member 13 and while the structure is under compression, which may be within a range of between sixty and seventy thousand pounds of pressure, the end member 12 is fixedly secured to the tube by at least three spot welds 20 of which two are shown in FIG. 6 whereby to provide a compact composite cylinder structure. It should be noted that the spacing between the notches is such that when winding the spiral, a notch always covers an adjacent part of the spiral that contains no notch. In other words, each notch and adjacent layers of the strip define a hole, opening or recess, all which is illustrated in FIGS. 3 and 4.

A very significant feature of the invention resides in providing a cylinder structure of the character described in the preceding paragraph in which the outer notches are automatically spread apart or widened to assume V-shapes as depicted in FIGS. 4 and 5, when the strip correctly encircles the pilot tube. This unique improvement facilitates outflow of the extruded material through the widened or tapered passages 5 and reduces friction.

As alluded to above the strip of metal, preferably stainless steel, has been rolled by a steel mill to provide a finish known as a braze finish and this means that the strip surface is not smooth but is slightly rough so that when the strips are pressed together there will be voids therebetween in order to permit the infusion or flow of the brazing material between the strips and between the latter and the pilot tube and end members to obtain a solid unitary cylinder as shown in FIG. 6. The brazing material utilized is preferably an alloy of silver in a powdered form embodied in a vehicle or lacquer or varnish to provide a solution which is sprayed, painted or otherwise applied to the structure of FIG. 6 which leaves a coating of fine silver alloy over the spiral section of the assembly after the vehicle evaporates.

When the assembly has been coated with the silver it is placed in a furnace at high temperature. The atmosphere in the furnace is disassociated ammonia which is a mixture of nitrogen and hydrogen. The hydrogen removes the oxides from the surface of the stainless steel cylinder and permits the silver alloy to flow between all contacting surfaces of the assembly so the latter finally becomes a single piece of material.

After the assembly has cooled in the furnace, it is removed and placed in a lathe having a tool which removes the pilot tube and the innermost portions of the convolutions of the strip or connecting portions 19 which formerly closed off the inner ends of the holes or openings and thereby provide the cylinder with a multitude of substantially circumferentially and longitudinally spaced radially extending passages or non-circular holes through which the material is extruded outwardly of the cylinder and through the openings 6 in the casing 1. The external portion of the cylinder may be subjected to an appropriate machinery operation in order to give it a finished appearance.

Figure 7:
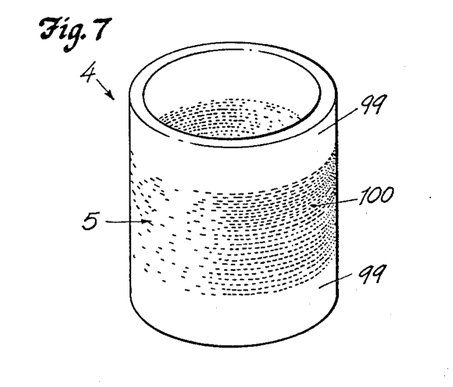
FIG. 7 is a pictorial view of finished cylindrical wall structure.

Attention is directed to FIG. 7 of the drawing which discloses a finished cylindrical wall structure and has been constructed by the procedure or method as described above. That structure is intended to represent one actually constructed which has an outside diameter of 5.5" with a wall thickness of 0.200". The length of the active area containing the holes is 5". The thickness of the strip is 0.020" and the width of the notches is 0.0265" which makes an area the same as a round hole having a diameter of 0.026". The number of holes per revolution of the spiral is 90.5. The number of spirals is 250 and the number of holes or passages in the cylinder wall is 22,625.

Figure 8:
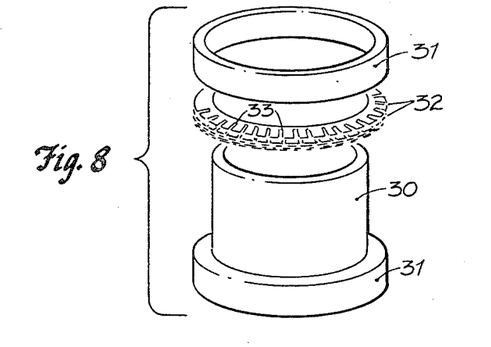
FIG. 8 is an exploded view of components of a first modified cylinder structure embodying the invention or inventions.

CYLINDER STRUCTURE OF FIG. 8

The subject invention or inventions involve modifications and FIG. 8 illustrates what may be referred to as the first as disclosed in this application. The principal difference between this modified structure and the structure described in FIGS. 2–7 resides in providing an infinite number of circular layers of metal which are in the form of annular punched out rings, as distinguished from utilizing circular layers of a continuous strip. More particularly, there is depicted in FIG. 8 a support, preferably in the form of a cylindrical pilot tube 30 having annular end members 31 and an appreciable number of annular rings 32 which are assembled about the tube. The peripheries or outer marginal edges of the rings are provided with punched out circumferentially spaced radial notches 33 which may be shaped generally rectangular, tapered or otherwise as will be described subsequently. The rings are assembled so that the notches and portions of adjacent rings define holes, the inner ends of which are closed by the inner annular portions of the rings. When the rings are correctly assembled about the tube, compressed and held by spot welding the end members to the tube substantially as described above with respect to the preferred structure, the complete assembly is treated with a brazing material and then heated in a furnace whereby the rings, pilot tube and end members are joined to provide a unitary cylindrical wall structure. After the structure has cooled, what was formerly the pilot tube and the inner annular portions of the rings are removed by a tool of a lathe to open the inner ends of the holes so that the latter radially extend entirely through the wall structure and thereby provide what may be termed passages, slots, holes or openings through which the material is extruded. The external cylindrical surface of the cylinder may be machined smooth to give it a finished appearance like the preferred cylinder structure.

Figure 9:
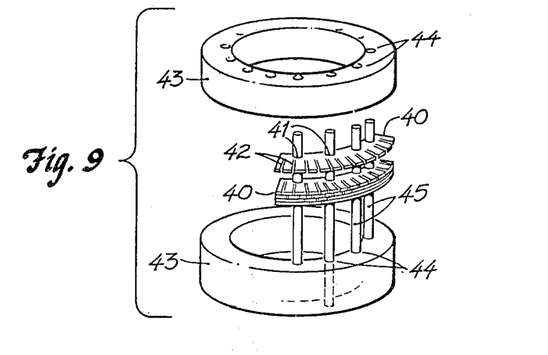
FIG. 9 is an exploded view of components of a partially completed second modified cylinder structure embodying the invention or inventions.

CYLINDER STRUCTURE OF FIG. 9

The invention also contemplates the modified structure exemplified in FIG. 9. The primary difference between the structure of FIG. 9 and FIG. 8 involves providing the circular layers in the form of arcuate sections 40 each of which is provided with an inner arcuate row of spaced holes 41 and an outer surface edge portion provided with an appreciable number of notches 42 of any shape desired. The structure also includes a pair of annular end members 43 which are respectively provided with circumferentially spaced holes 44. A predetermined number of elongated cylindrical rods 45 extend through the holes 41 in the sections for correctly holding the sections in place and the extremities of the rods extend into the holes 44 of the end members. The rods provide a pilot or support for the sections. When the sections, rods and end members are assembled and held in a compact relationship by spot welding or otherwise, the assembly is sprayed with a brazing material, and then heat treated to provide a unitary cylindrical wall structure. It should be noted that the rods 45 extend through the inner portions of the end members and sections and these rods and inner portions are subsequently removed by a tool in a lathe to open up the inner ends of the notches 42 to provide a multitude of radial passages through which the material is extruded for the use intended. The rods can be connected to the end members by upsetting the ends of the rods or spot welding them to the end members.

Figure 10:
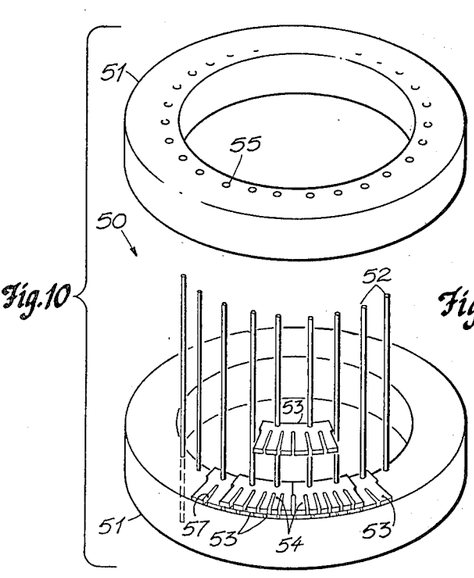
FIG. 10 is an exploded view of components utilized in constructing a modified cylinder structure.
Figure 11:
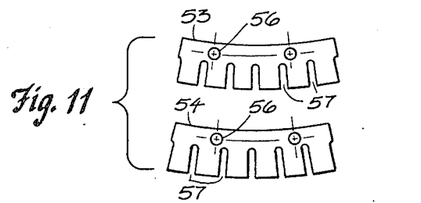
FIG. 11 shows partial plan views of circular layers of metal in the form of arcuate segments constituting components of the structure shown in FIG. 10.
Figure 12:
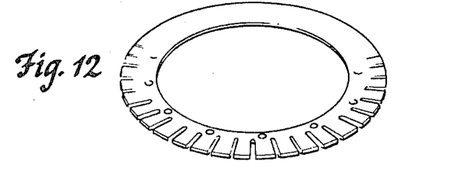
FIG. 12 is a view showing that an appreciable number of annular rings may be used in lieu of the segments depicted in FIG. 10.

CYLINDER STRUCTURE OF FIGS. 10–12

The modification illustrated in FIGS. 10, 11 and 12 involves a structure generally designated 50 which is somewhat similar to the one depicted in FIG. 9 in that it comprises a pair of annular end members 51, a plurality of corresponding cylindrical rods 52 and an appreciable number of arcuate segments 53 and 54 which are connected to the rods for disposition between the end members.

More particularly, the structure 50 differs from the structure of FIG. 9 by providing the segments 53 and 54 which are laid to overlap one another so that the marginal ends of the segments are covered and protected by overlying and underlying portions of adjacent segments as shown in FIG. 10.

It should be observed that each of the end members 51 is provided with a plurality of circumferentially spaced inner holes 55 and that the ends of the rods are disposed in these holes so that the rods and/or end members provide a support or mounting for the segments. The segments 53 and 54 as shown in FIG. 11 are identical in design and construction and the segment 54 is shown as being inverted. All of the segments are punched out from sheet material and provided with circumferentially spaced apertures 56 which receive a pair of rods and with externally punched out substantially rectangular notches 57. The setup is preferably such that all the segments 53 are assembled with the rods to provide a circular ring or layer of metal and then a layer of the segments 54 is superimposed upon the underlayer of segments 53. When the segments are correctly connected to the rods or assembled the segments form alternate layers comprised of what may be termed two different kinds of parts, due to the inversion of the parts or segments. The outside diameters of the rings formed by the layers of segments may substantially correspond to the outside diameters of the end members 51 as shown. It should also be observed that the relationship of the apertures 56 in the segments and circumferential spacing of the rods 52 is such that the overlapping of the segments is achieved.

When all of the components of the structure 50 are correctly assembled, the assembly is compressed and the rod ends are fixedly secured to the end members and then a brazing material is preferably applied to the assembly for subsequently heat treating the assembly to unite all of its components to provide a cylindrical unitary wall which is then subjected to a cutting operation to remove an inner internal area thereof whereby to open the holes to provide a multitude of radial passages as substantially described above with respect to the structures disclosed in FIG. 9.

In FIG. 12 there is depicted structure whereby to indicate that the alternate layers of segments 53 and 54 can be comprised of annular rings punched out of sheet material as disclosed in FIG. 8.

Figure 13:
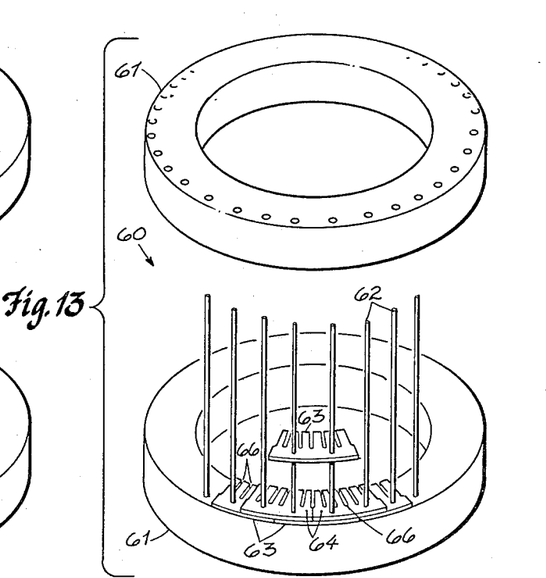
FIG. 13 is an exploded view of components employed in constructing another modified cylinder structure.
Figure 14:
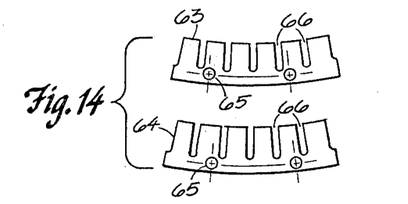
FIG. 14 depicts partial plan views of circular layers of metal in the form of arcuate segments constituting components of the structure shown in FIG. 13 and in which the inner marginal edges of the layers are provided with circumferentially spaced radial notches, as distinguished from providing segments or layers with external notches as depicted in FIGS. 10, 11 and 12.
Figure 15:
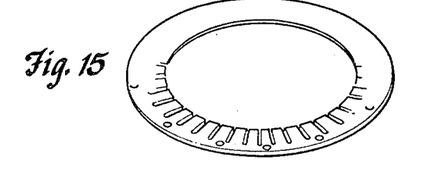
FIG. 15 is a view showing that annular rings may be utilized in the structure of FIG. 13 in lieu of the segments shown in FIG. 14.

CYLINDER STRUCTURE OF FIGURES 13–15

The invention or inventions also contemplates providing a structure generally designated 60 which is somewhat similar to the structures shown in FIGS. 9 and 10 and constitutes a meritorious improvement by providing circular layers or segments with inner circumferentially spaced notches, as distinguished from providing them externally as described above. More specifically, the structure comprises a pair of annular end members 61, plurality of corresponding cylindrical rods 62 and an appreciable number of arcuate segments 63 and 64 which are connected to the rods for assembly between the end members. Each of the segments is provided with a pair of circumferentially spaced apertures 65 through which the rods extend and with circumferentially spaced inner radial substantially rectangular notches 66. The segments 63 are laid to constitute a layer of metal and the segments 64 are inverted and connected to the rods to constitute a layer superimposed upon the underlying layer of segments 63 and when a sufficient number of alternate layers have been laid in relation to the rods and end members to provide an assembly, the latter is compressed, treated with a brazing material and heated to unite all of the components to form a unitary cylindrical wall. The structure is such that an external cylinder area of the wall can be removed to externally open or expose holes formed by the notches and portions of adjacent layers of metal and thereby provide a multitude of radial non-circular passages. Attention is directed to the fact that apertures 65 in the segments and the holes in the end members are located near the peripheries of these members and the outer marginal edges of the segments, thereby permitting removal of what was formerly the rods and outer portions of the segments.

FIG. 15 depicts structure to show that the alternate layers of segments 63 and 64 can be punched out of sheet metal stock to provide annular rings as illustrated in FIGS. 8 and 12.

Figure 16:
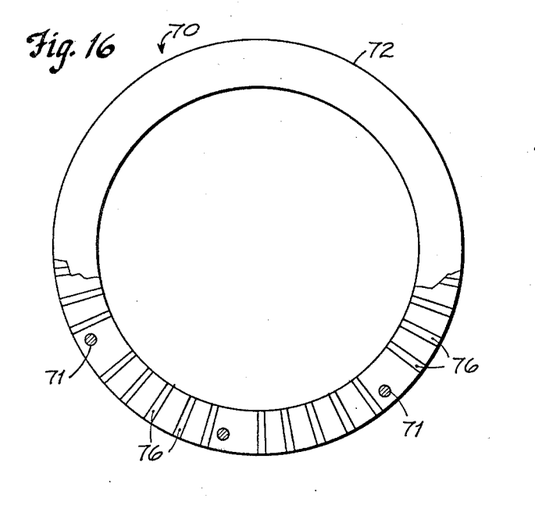
FIG. 16 is a top view of a complete cylinder structure with a portion thereof broken away to illustrate the use of arcuate segments of the character shown in FIG. 17.
Figure 17:
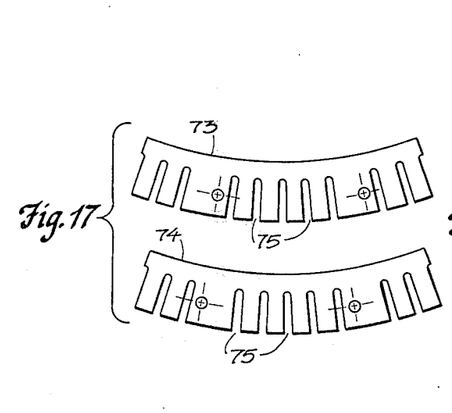
FIG. 17 shows partial plan views of segments employed in the cylinder of FIG. 16.
Figure 18:
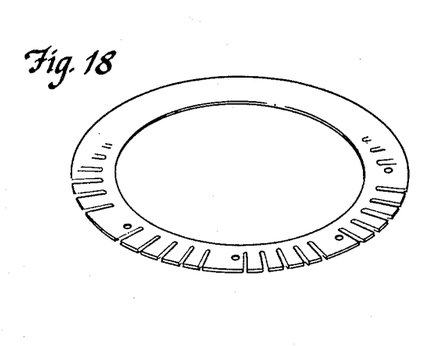
FIG. 18 is a small top view of one of an appreciable number of externally notched annular rings which may be used in lieu of the segments of FIG. 17.

CYLINDER STRUCTURE OF FIGS. 16–18

The modification of the invention or inventions also provides for a structure generally designated 70. FIG. 16 shows a completed structure with, a portion in section, to illustrate the fact that it includes a plurality of circumferentially spaced rods 71 which serve to connect end members 72 (one shown) and locate arcuate segments, such as 73 and 74 in alternate layers substantially as described above with respect to FIGS. 10 and 13 so that external notches 75 in the segments in one layer in combination with portions of segments in adjacent layers form radial holes which are normally closed at their inner ends until they are opened to provide radial passages 76. The improvement embodied in the structure 70 resides in locating the rods 71 in predetermined positions that they are left within the wall of the completed cylinder and thereby constitute a unitary portion thereof and are not substantially removed by a cutting operation as described above with respect to the structure 50. The segments 73 and 74 are laid in alternate layers in substantially the same manner as the segments 53, 54, 63 and 64.

In FIG. 18 there is shown structure to indicate that the segments may be in the form of punched out annular rings.

Figure 19:
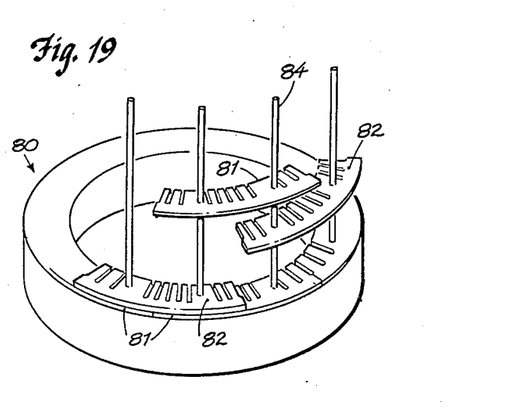
FIG. 19 is a view showing structure provided with radial notches which are normally open in the inside of the structure more or less as depicted in FIG. 13.
Figure 20:
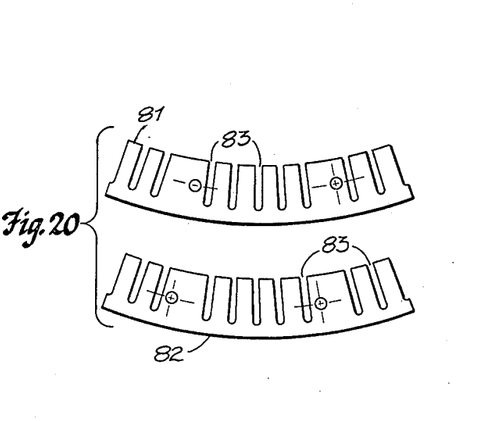
FIG. 20 shows plan views of segments used in the structure of FIG. 19.
Figure 21:
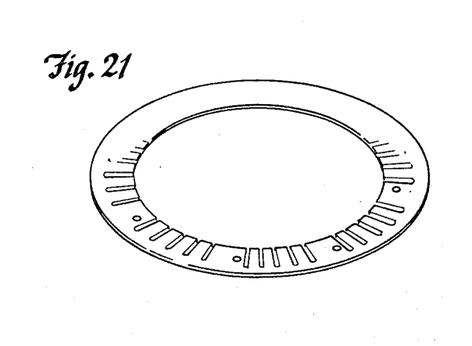
FIG. 21 is a small top view of one of many internally notched annular rings which can be utilized in lieu of segments.

CYLINDER STRUCTURE OF FIGS. 19–21

The modification of the invention illustrated in FIGS. 19, 20 and 21 embodies a structure generally designated 80 which, as shown, is similar to FIG. 16, the primary difference therebetween being that the segment 81 and 82 constituting components of the structure are provided with notches 83 which are open at their inner ends in a manner substantially the same as the notches 66 as shown in FIG. 13. The structure 80 also includes rods 84 and end members and the rods are not cut away but are left in the wall of the cylinder and constitute integral portions thereof, since all of the components are united in a manner as substantially described above in connection with the other structure.

In FIG. 21, there is shown a view of one of many annular rings which may be utilized in lieu of the segments 80 and 82.

Figure 22:
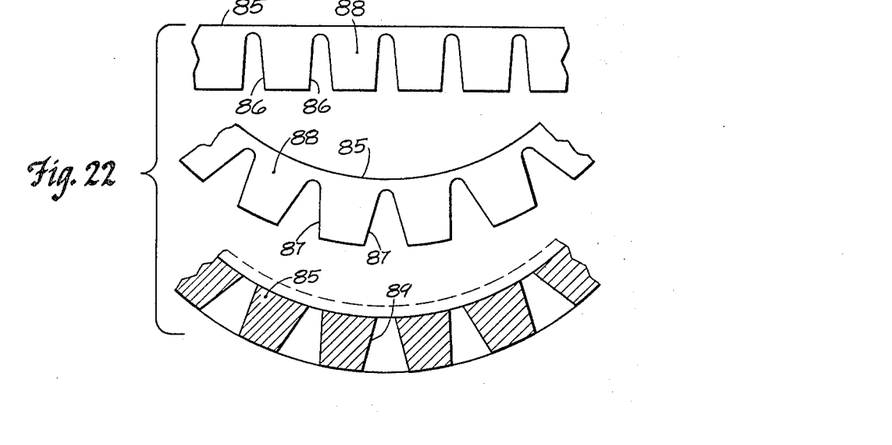
FIG. 22 shows plan views of a different form of a notch which is punched out of a strip of metal.

The invention or inventions are described above contemplate providing various forms or shapes of notches in the layers of metal and one such shape is diagramatically illustrated in FIG. 22 which shows a portion 85 of such a layer of a strip initially provided with tapered or generally V-shaped punched out notches 86 as distinguished from the notches shown in FIG. 2. When the strip is flexed or spiraled about a tube the notches are deformed to widen the same as indicated at 87 and when what was formerly an inner portion of the tube and inner portions 88 of the layers are removed the inner ends of the slots are exposed to provide radial passages or holes as indicated at 89.

Figure 23:
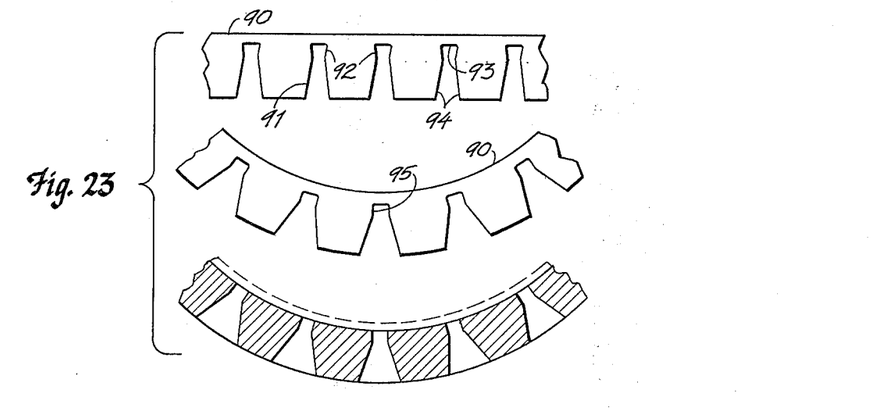
FIG. 23 shows plan views of another form or shape of a notch.

FIG. 23 diagramatically depicts notches in a portion of a layer 90 of a strip provided with notches generally designated 91 which are similar to those of FIG. 22 but are shaped or formed to offer certain advantages not present in the strip of FIG. 22. More specifically, each of the notches in the layer portion or strip 90 is preferably of what may be termed a compound character since it includes a relatively small inner notch defined by a pair of outwardly converging marginal edges 92 and an inner edge 93 and an outer larger notch defined by a pair of inwardly converging edges 94. When the layers of the strip are correctly coiled about a pilot tube or support, the smaller notches will spread apart as indicated at 95 so that the edges 92 of these notches are substantially parallel and the edges 94 of the larger outer notch are spread wider apart as shown. When the assembly has been sprayed with a brazing material and heat treated to provide a unitary cylinder structure the pilot tube and an inner cylindrical portion of the cylinder wall is machined away to provide radial passages or holes extending through the wall. The advantage of this setup of having no taper in a notch near the inside of the wall will permit the repair of damage cylinders by removing a part of the inside of the wall with a hone without changing the cross dimensions of the notches.

Figure 24:
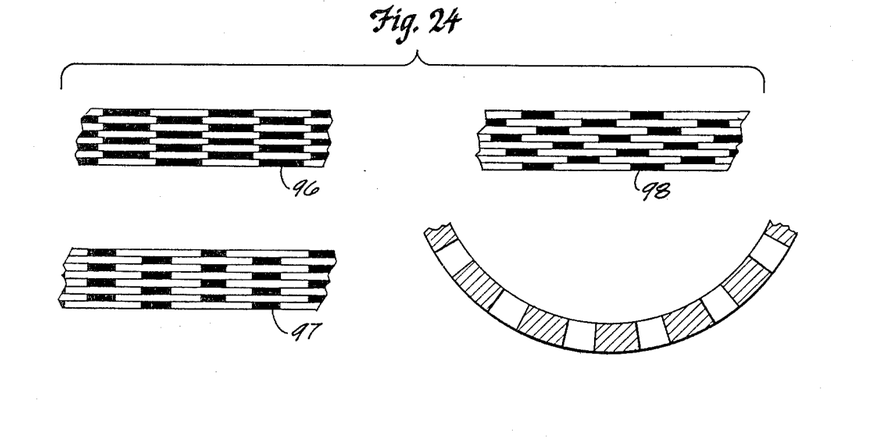
FIG. 24 are views showing how different forms or shapes of passages can be provided by varying the shape of the notches.

Of added significance is FIG. 24 which diagramatically discloses circular portions of cylinders which are provided with punched out rectangular notches, such as those which provide relatively wide passages as indicated at 96, relatively narrower passages as indicated at 97 and those as indicated at 98 which are still smaller and arranged in a different relationship to those designated 96 and 97. The plan view in FIG. 24 discloses the shape of one form of a notch provided in a circular layer of strip, segment or annular ring.

In view of the foregoing additional disclosures in FIGS. 22, 23 and 24 it should be manifest that layers of metal whether of a spiral, annular ring or segmental character can be provided with various forms or shapes of notches which in combination with adjacent layers will define holes or passages which offer advantages for extruding different materials.

The disclosures described above offer a tubular cylinder of the character illustrated in FIG. 7 which was actually constructed to provide a one-piece or unitary structure having end portions 99 which are substantially solid and an intervening cylindrical area 100 provided with a multitude of substantially radial passages of a non-circular configuration. As alluded to above, the invention is considered to constitute a meritorious advance in the art and provides a one-piece structure in which the passages are substantially formed by circular layers of metal, as distinguished from cylinders in which the passages are formed by drilling holes through solid cylinder walls.

Having thus described our invention or inventions, it is obvious that various modifications or addition to those described may be made in the same without departing from the spirit of the invention and, therefore, we do not wish to be understood as limiting ourselves to the exact forms, constructions, arrangements, and combinations of the components herein shown and described.

We claim:

1. A method of constructing a cylinder comprising providing a support, asssembling an appreciable number of notched circular layers of metal about said support, compressing said layers, brazing said layers and support while the layers are compressed to provide a unitary tubular cylinder, and cutting away a cylindrical portion of said cylinder whereby said notches provide a multitude of circumferentially and longitudinally spaced substantially radially extending passages extending through the wall of the cylinder.

2. A method which comprises providing a metal support structure, providing circular layers of metal which are assembled about said structure, said layers being previously provided with a multitude of notches which in combination with adjacent laid layers form radial holes, compressing and uniting said layers with said structure to provide a unitary cylindrical wall, and then removing at least some of said support structure and portions of said layers to open said holes whereby to provide said wall with a multitude of radial passages extending therethrough.

3. A method which comprises providing a cylindrical tube, a planar strip of metal of uniform thickness having one longitudinal edge thereof provided with a multitude of spaced notches to afford bending of the strip, coiling the strip substantially in its own plane about said tube to widen said notches and so the latter is combination with adjacent layers of the strip form radial holes, compressing and connecting the coil to said tube to form a single unitary cylindrical wall, and then removing at least a portion of said wall to open said holes and thereby provide said wall with a multitude of radial passages extending therethrough 4. A method of constructing a cylinder which comprises providing a support having a tubular cylindrical formation, encircling said formation substantially throughout its length with an appreciable number of layers of metal which have inner portions engaging said formation and outer portions which are interrupted by circumferentially spaced radially extending notches, clamping and holding said layers assembled about said formation to provide a cylindrical wall, and then cutting away at least a cylindrical portion of said wall whereby said notches are opened to provide a multitude of passages which extend through said wall.

5. A method of constructing a cylinder comprising providing a support, providing an appreciable number of punched out annular rings, providing the peripheries of said rings with punched out circumferentially spaced outer radial notches, assembling the rings about said support in a manner whereby said notches and portions of adjacent rings define a multitude of radial holes having inner closed ends, compressing said rings, uniting said rings and support while the rings are compressed to provide a unitary cylindrical wall, and then removing at least a cylindrical internal area of said wall to open said closed ends whereby to provide a multitude of radial passages extending through said wall.

6. A method of constructing a cylinder comprising providing a support, assembling an appreciable number of externally notched circular layers of metal about said support, compressing said layers, brazing said layers and support while the layers are compressed to provide a unitary tubular cylinder, and cutting away an inner cylindrical portion of said cylinder whereby said notches provide a multitude of circumferentially and longitudinally spaced substantially radially extending passages extending through the wall of the cylinder.

7. A method which comprises providing a metal support structure, proving circular layers of metal which are assembled about said structure, said layers being previously provided with a multitude of external notches which in combination with adjacent laid layers form radial holes, compressing and uniting said layers with said structure to provide a unitary cylindrical wall, and then removing at least some of an internal area of said support structure and inner portions of said layers to open said holes whereby to provide said wall with a multitude of radial passages extending therethrough.

8. A method which comprises providing a cylindrical tube, a planar strip of metal of uniform thickness having one longitudinal edge thereof provided with a multitude of spaced notches to afford bending of the strip, coiling the strip substantially in its own plane about said tube to widen said notches and so the latter in combination with adjacent layers of the strip from radial holes, compressing the coil and uniting it with said tube to form a single unitary cylindrical wall, and then removing at least an inner portion of said wall to open said holes and thereby provide said wall with a multitude of radial passages extending therethrough.

9. A method of constructing a cylinder which comprises providing a support having a tubular cylindrical formation, encircling said formation substantially throughout its length with an appreciable number of layers of metal which have inner portions engaging said formation and outer portions which are interrupted by circumferentially spaced radially extending notches, clamping and holding said layers assembled about said formation, uniting said layers and formation to provide a unitary cylindrical wall, and then cutting away at least an internal cylindrical portion of said wall whereby said notches are opened to provide a multitude of passages which extend through said wall.

10. A method of constructing a cylinder comprising providing a support consisting of a pair of end members and a plurality of rods, fixedly securing one end of each rod to an end member to locate the rods in a circumferential spaced relation providing a multitude of circular layers of metal with apertures therein and spaced notches, assembling the layers with the rods by extending the latter through the apertures whereby the layers substantially define contacting cylindrical layers of metal and so that the notches in combination with adjacent portions of the layers form holes having closed ends, fitting the other end member to the other ends of the rods, compressing the layers between the end members, fixedly holding the layers compressed, uniting the layers, rods and end members to form a unitary cylindrical wall, and then removing a portion of this wall to open the closed ends of said holes whereby to provide a multitude of radial passages extending through said wall.

11. A method of constructing a cylinder comprising providing a support consisting of a pair of end members and a plurality of rods, fixedly securing one end of each rod to an end member to locate the rods in a circumferential spaced relation, providing a multitude of arcuate metal segments with apertures therein and inner portions provided with spaced inner notches, assembling the segments with the rods by extending the latter through the apertures whereby the segments substantially define contacting cylindrical layers of metal and so that the notches in combination with adjacent portions of the segments form holes having closed outer ends, fitting the other end member to the other ends of the rods, compressing the layers between the end members, fixedly holding the layers compressed, uniting the layers, rods and end members to form a unitary cylindrical wall, and then removing an outer cylindrical area of this wall to open the closed ends of said holes whereby to provide a multitude of radial passages extending through said wall.

12. A method of constructing a cylinder comprising providing a support, assembling and appreciable number of internally notched circular layers of metal about said support, compressing said layers of metal about said support, compressing said layers, brazing said layers and support while the layers are compressed to provide a unitary tubular cylinder, and cutting away an outer cylindrical portion of said cylinder whereby said notches provide a multitude of circumferentially and longitudinally spaced substantially radially extending passages extending through the wall of the cylinder.

13. A method of constructing a cylinder comprising providing a support, providing an appreciable number of punched out annular rings, providing inner portions of said rings with punched out circumferentially spaced inner radial notches, assembling the rings about said support in a manner whereby said notches and portions of adjacent rings define a multitude of radial holes having outer closed ends, compressing said rings, uniting said rings and support while the rings are compressed to provide a unitary cylindrical wall, and then removing at least an outer cylindrical area of said wall to open said closed ends whereby to provide a multitude of radial passages extending through said wall.

* * * * *